April 14, 1936.  C. H. HAPGOOD  2,037,467

CONTINUOUS MILK DELIVERY SYSTEM

Filed May 31, 1932

INVENTOR

WITNESS:

Cyrus Howard Hapgood
BY
ATTORNEYS.

Patented Apr. 14, 1936

2,037,467

UNITED STATES PATENT OFFICE 2,037,467

CONTINUOUS MILK DELIVERY SYSTEM

Cyrus Howard Hapgood, Nutley, N. J., assignor to The De Laval Separator Company, New York, N. Y., a corporation of New Jersey Application May 31, 1932, Serial No. 614,490

4 Claims. (Cl. 226—116)

My invention is applicable to that type of milking machine wherein the milk from the cows is discharged, usually through separate pails, into a common milk discharge pipe line. The object of the invention is to provide simple and inexpensive means whereby the milk discharged through this pipe line may be discharged direct into the cans or pails in wich the milk is shipped.

Two preferred embodiments of the invention are shown in the accompanying drawing, wherein:—

Figure 1:
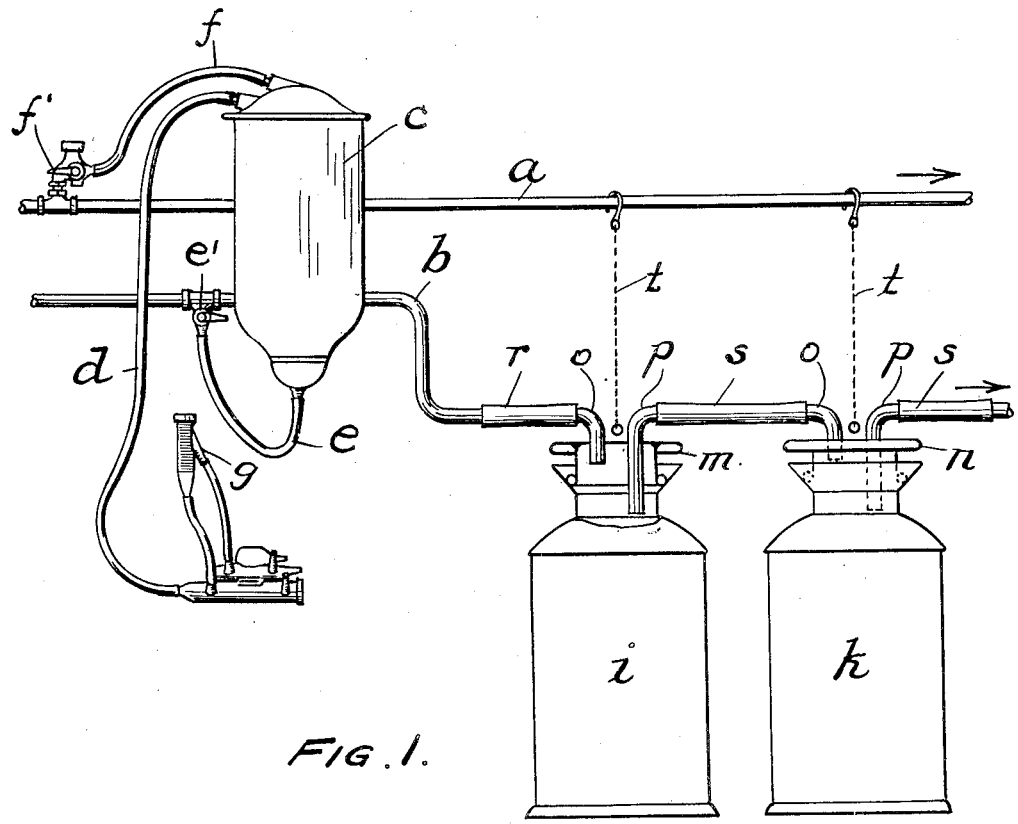
Fig. 1 is a side elevation of a milking machine installation embodying my invention.

Extending along the inside of a cow barn or other enclosure for milking is a vacuum pipe line $a$ and a milk discharge pipe line $b$. Positioned along these pipe lines are any number of temporary milk receivers $c$, each having a bottom milk hose connection $e$ with the milk pipe line $b$, a top milk hose connection $d$ with a set of teat cups $g$ and a top air hose connection $f$ with the vacuum pipe line $a$. This construction is described in detail in an application filed by me June 3, 1932, Serial No. 615,118. Instead, the milking system shown in the Hapgood Patent No. 1,846,805, or that shown in applications filed by me June 3, 1932. Serial Nos. 615,117 and 615,119, may be used. In fact, the invention is applicable to any milking system wherein milk is discharged through a common pipe line.

In the milking system herein shown, a valve $f'$ at the connection of air hose $f$ with the vacuum pipe line is adapted to be turned to connect the air hose with either the vacuum pipe line $a$ or with the atmosphere; and a valve $e'$ is adapted to close or open communication between milk hose $e$ and the milk pipe line $b$.

In operation, during milking valve $f'$ is moved to connect air hose $f$ with the vacuum pipe line $a$ and valve $e'$ is closed, and milk flows from the teat cups through milk hose $d$ into the receiver $c$. The milk in the receiver may then be weighed, or may be measured by observation. To discharge the milk from the receiver, valve $f'$ is moved to connect air hose $f$ with the atmosphere and valve $e'$ is opened.

At the outlet end of the milk discharge pipe is arranged a series of two or more milk cans or pails $i$, $k$, etc. having tops or covers hereinafter called filling heads, $m$, $n$, etc. Each filling head is provided with an inlet tube $o$ and an outlet tube $p$, the outlet tube extending down below the milk inlet tube $o$ and to the desired upper level of the milk to be supplied to the pail. The inlet tube of the first pail of the series is connectible with the exit end of the milk discharge pipe line $b$, preferably by means of a short flexible tube or hose section $r$. The outlet tube $p$ from each milk pail is connectible with the inlet tube $o$ of the next pail of the series, preferably by a short flexible tube or hose section $s$. The last outlet tube $p$ is similarly connectible with a pipe (not shown) connected with a vacuum pump or vacuum reservoir.

As milk is discharged from the receivers $c$ it flows through milk pipe line $b$, tube $r$ and inlet tube $o$ into pail $i$. After the milk in pail $i$ accumulates to a level above the lower or inlet end of the outlet tube, excess milk flowing into pail $i$ is withdrawn, by reason of the described vacuum, into pail $k$. The same operation occurs in pail $k$ after milk accumulates therein to above the level of its milk outlet tube $p$, the excess milk flowing into the next pail (not shown) of the series. It is assumed that a sufficient number of pails will be provided to hold the entire amount of milk produced in milking the entire herd of cows.

It is preferred to make the filling heads $m$, $n$ removable, so that the milk cans or pails may be removed at the conclusion of milking and fitted with a conventional milk can closure.

The several filling heads may be suspended from flexible hangers $t$ so as to enable them to be lifted off the pail bodies; or the filling heads may be suspended in fixed position and the pail bodies removed by mounting them on a vertically movable platform and lowering the platform.

Figure 2:
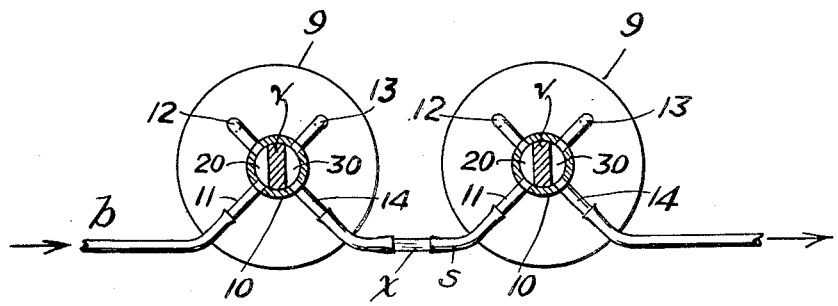
Fig. 2 is a sectional plan view of a modification comprising a different construction and arrangement of milk receiving cans.

It may be desirable, in some installations, to provide for the removal of a milk can or pail after it is filled. In Fig. 2 a modification is shown, wherein each filling head 9 is provided with a valve chamber 10 having four ports connecting respectively with a milk inlet nozzle 11, a milk inlet tube 12, a milk outlet tube 13 and a milk outlet nozzle 14. The milk inlet nozzle 11 of the first filling head of the series is adapted for connection with the milk discharge pipe line $b$. The milk outlet tube 14 of the first filling head of the series is adapted for connection with the milk inlet nozzle 11 of the second filling head of the series. The milk outlet tube 14 of the second pail of the series may be connected with the milk inlet nozzle 11 of the third pail of the series, if a series of more than two pails is provided; and so on successively. The milk outlet tube 14 of the last pail of the series is connected with a source of vacuum. In this modification of the invention, however, it is not necessary to have more than two pails in series, regardless of the total amount of milk to be handled, as hereinafter explained.

Each valve chamber is provided with a valve $v$ having two passages 20 and 30. When the valves $v$ are in positions shown in the drawing, milk flows from the milk pipe line $b$ through inlet nozzle 11, passage 20 and tube 12 into the first pail, wherein it accumulates until the level of milk rises above the lower end of tube 13, whereupon the milk flows through tube 13, passage 30 and nozzle 14, into and through the milk inlet nozzle 11, passage 20 and tube 12 of the second pail. As soon as this flow into the second pail starts, or at any time after it starts, valve $v$ of the first pail may be turned to directly connect, through passage 30, milk inlet nozzle 11 with milk outlet nozzle 14 and thereupon milk will flow direct from the milk pipe line into the second pail. While the milk is so flowing the first full pail may be removed, another pail substituted, and the valve $v$ of the first pail top returned to its original position, whereupon milk again flows into the first pail of the series. In this arrangement, the second pail of the series may be utilized merely to receive such milk as flows through the milk pipe line $b$ while the first pail is being removed and replaced by an empty pail; or the second pail may be allowed to fill until milk overflows into the third pail, if a third pail top be provided; or, if there be but two pails, the second pail may be allowed to fill before returning the valve $v$ of the first pail top to its original position. Glass tube $x$ interposed in connection $s$ may be used to detect when a pail is full.

What I claim and desire to protect by Letters Patent is:

1. In a milking machine, a milk delivery system for successively and continuously filling a series of milk cans to a predetermined level, comprising a series of filling can heads adapted to be positioned on the can bodies of such series, a milk inlet tube carried by each filling head, a milk outlet tube carried by each filling head except the last of the series, means connecting each milk outlet tube with the milk inlet tube of the next filling head of the series, and means connecting the milk inlet tube of the first filling head of the series with the milk pipe line, the last can of the series being adapted to be subjected to a partial vacuum, the inflow end of each milk outlet tube extending below the level of the outflow end of the corresponding milk inlet tube and also into the can body a comparatively short distance to a level corresponding to the level to which it is desired to fill the can body, whereby milk may flow into and fill the first can body to an approximately predetermined level and then flow into the next can of the series, while any air entering with the milk flowing into a filled can passes substantially directly into the milk outlet tube of such can without passing through the bulk of the milk contained in such can.

2. In a milking machine, a continuous milk delivery system comprising a milk pipe line, a series of filling heads adapted to be positioned on a series of cans, a milk inlet tube and a milk outlet tube carried by the first filling head of the series, said milk outlet tube communicating with the second milk can of the series, the inflow end of the milk outlet tube extending below the level of the outflow end of the milk inlet tube, and a valve carried by the first filling head and movable into one position to connect the milk pipe line with the milk inlet tube of the first can and movable into another position to connect the milk pipe line with the milk outlet tube of the first can.

3. In a milking machine, a continuous milk delivery system comprising a milk pipe line, a series of filling heads adapted to be positioned on a series of cans, a milk inlet tube and two milk outlet tubes carried by the first filling head of the series, one of said milk outlet tubes being adapted to withdraw milk from a removable milk can body to which the first filling head of the series is adapted to be removably applied, the second milk outlet tube communicating with the second milk can of the series, and a valve carried by the first filling head and movable into one position to connect the milk pipe line with the milk inlet tube of the first filling head and simultaneously to connect the two milk outlet tubes one with the other, and movable into another position to connect the milk pipe line with the second specified milk outlet tube.

4. In a milking machine, a continuous milk delivery system comprising a milk pipe line, a series of filling heads to which can bodies are adapted to be removably applied, a milk inlet tube and a milk outlet tube carried by the first filling head of the series, said tubes extending downward within the first filling head of the series, the milk outlet tube extending below the level of the milk inlet tube, a third milk tube communicating with the second filling head of the series, a valve movable into one position to connect the milk pipe line with the milk inlet tube of the first filling top of the series and to connect the milk outlet of the first filling head with said third milk tube, whereby pneumatic suction applied through the second can of the series will fill the first can body to a predetermined level and then divert milk through said milk outlet tube and said third milk tube to the second can of the series, said valve being then movable into another position to connect the milk pipe line with said third milk tube and allow the removal of the first and filled can body and its replacement by an empty can body.

CYRUS HOWARD HAPGOOD.